United States Patent

Schwartz

[15] 3,673,559
[45] June 27, 1972

[54] PULSE RESOLUTION SYSTEM

[72] Inventor: Robert J. Schwartz, Houston, Tex.

[73] Assignee: Schlumberger Technology Corporation, Houston, Tex.

[22] Filed: Sept. 18, 1968

[21] Appl. No.: 767,904

Related U.S. Application Data

[63] Continuation-in-part of Ser. No. 593,385, Nov. 10, 1966, abandoned.

[52] U.S. Cl................340/18, 250/83.6, 307/234, 307/267, 307/273, 328/58, 328/111, 328/164
[51] Int. Cl.................H03k 4/10, H04b 3/00
[58] Field of Search............340/347 DD, 18 P; 250/83.6 W; 307/234, 267, 273; 328/162, 164, 111, 58

[56] References Cited

UNITED STATES PATENTS

| | | | |
|---|---|---|---|
| 2,806,139 | 9/1957 | Le Clerc | 328/164 |
| 2,866,896 | 12/1958 | Stampfl | 328/164 |
| 3,105,194 | 9/1963 | Rappeport | 328/164 |
| 3,237,153 | 2/1966 | Blizard | 340/18 |
| 3,327,230 | 6/1967 | Konian | 328/164 |

OTHER PUBLICATIONS

Army Technical Manual TM 11- 690, Basic Theory and Application of Transistors, 1959, pp. 205- 209.

*Primary Examiner*—Rodney D. Bennett, Jr.
*Assistant Examiner*—Daniel C. Kaufman
*Attorney*—Brumbaugh, Graves, Donohue & Raymond

[57] ABSTRACT

Apparatus in an earth bore logging system for restoring two or more closely occuring pulses which have become distorted through transmission from subsurface equipment to the surface to the extent that such pulses tend to merge into a single pulse of longer duration. Each pulse from the subsurface signal source is extended in duration to a predetermined pulse width when widely separated from adjacent pulses, and is extended to a greater extent when a successive pulse occurs during the predetermined pulse width period. The pulses are then transmitted to the surface where such extended pulses are amplitude normalized. Each normalized received pulse at the surface is used to generate a pulse having a duration proportional to the duration at which the amplitude of the normalized pulse exceeds a given level. Each of the trigger pulses in turn results in the production of a reference pulse terminating after termination of a trigger pulse of normal duration, representative of a single pulse before transmission. A first output pulse is generated in response to one of the trigger and reference pulses and a second output pulse is generated only upon time coincidence of the trigger pulse and termination of the reference pulse. The widths of the reference pulses may be automatically adjusted according to variations in the average widths of the trigger pulses.

30 Claims, 13 Drawing Figures

INVENTOR.
ROBERT J. SCHWARTZ

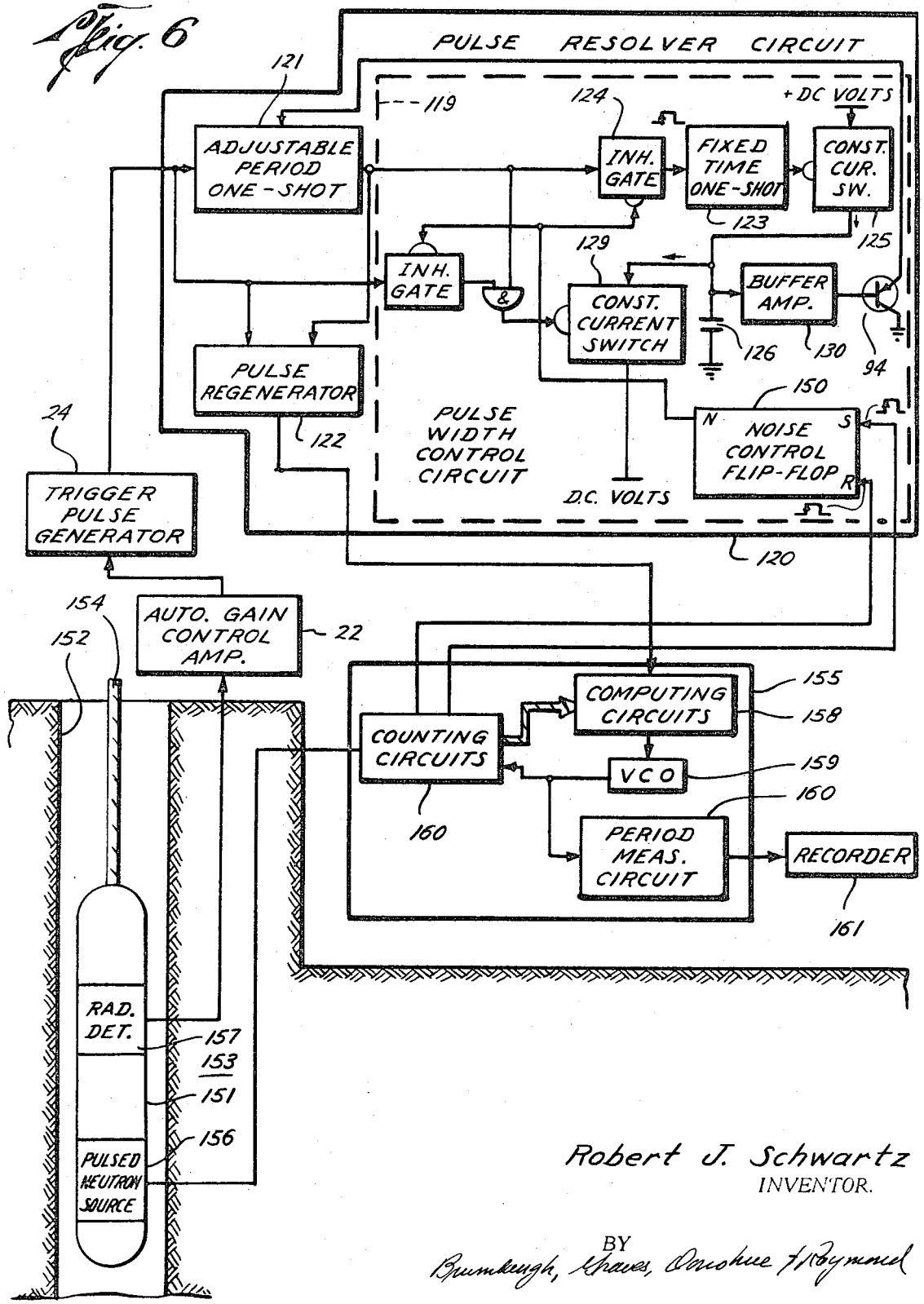

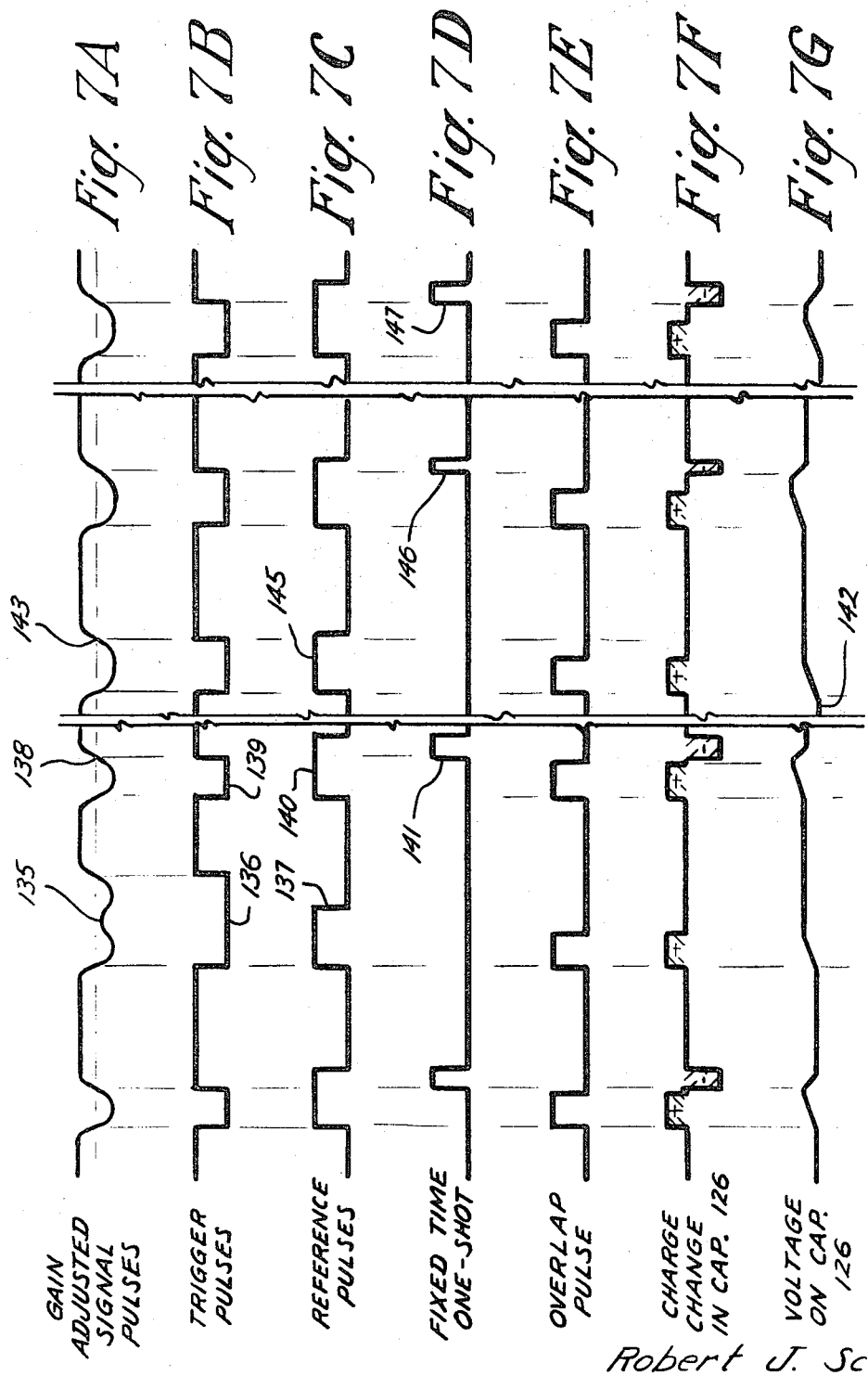

PULSE RESOLUTION SYSTEM

This application is a continuation-in-part of application Ser. No. 593,385, filed Nov. 10, 1966, now abandoned.

This invention relates to pulse processing arrangements and, in particular, to apparatus and systems for transmitting and detecting closely spaced signal pulses.

In a wide variety of communication, telemetering and data processing systems, information from a signal source is transmitted in the form of pulses to detection apparatus which records, counts the number of or otherwise processes the transmitted pulses. Generally, the detection of a series of distinct pulses offers no problem, and conventional detection equipment such as trigger circuits, counters and amplifiers may be employed. Often, however, the frequency, or repetition rate, of the pulses varies over a wide range such that the spacings between successive pulses are sometimes very short. In some cases the pulses occur more rapidly than the rate at which the transmission system can pass a pair of closely spaced pulses between the pulse source and the detection apparatus. For example, as the spacing between transmitted pulses decreases, the resultant transmitted pulses tend to merge along a time axis into a single, longer combination pulse. When this occurs, it is usually difficult, if not impossible, to distinguish between a true single pulse and a pair of pulses merged into a single pulse waveform.

In the logging of well bore drilled into earth formations, information relative to the presence of hydrocarbons, for example, is often generated downhole in the form of pulses whose average repetition rate (and consequently, spacing) varies in accordance with the particular formation characteristic being sensed. The pulses are transmitted to the surface information processing equipment via a cable which may be as much as twenty thousand feet in length, or more. The effect of the cable transmission path is to distort the individual pulses. The distortion, coupled with the occurrence of closely spaced pulses (relative to the bandwidth capabilities of the cable), tends to obliterate the distinctiveness of the pulses, resulting in pulse wave shapes with greater pulse widths. Where it is desired to count individual pulses, the distortions of closely spaced pulses by the cable often results in counting losses at the surface where the pulses are counted. Hence, the surface count of pulses can be significantly less than the actual number of pulses generated by the downhole equipment.

To understand how distortion appears, it should be appreciated that the bandwidth of a transmission system such as a cable is such that the closest spacing at which individual pulses can be resolved is known as the pulse resolution capability or time period. To make maximum effective use of this capability the width of a transmitted pulse should occupy a period approaching one-half of this interval. Should two successive input pulses be repeated by less than one-half of the pulse resolution time period or otherwise occur within the pulse resolution time period, then the successive pulses will lose their distinctiveness.

Accordingly, it is the primary object of the present invention to provide improved apparatus for the detection and restoration of a signal pulse train after transmission over a distorting path.

An additional object of this invention is to provide improved apparatus for the detection and separation of overlapping pulses.

Another object of the invention is to provide novel apparatus for generating a single pulse whose width depends upon the time spacing between a pair of pulses occurring at a rate greater than the normally expected maximum frequency rate of generation from a pulse source.

Yet another object of the invention is to provide an improved pulse resolution system for use in well logging operations.

In brief, these and other objects of the invention are attained by developing a train of trigger pulses respectively corresponding to the individual pulses of an input signal train, some of which may represent a pair of merged single pulses. The duration of a trigger pulse is proportional to the input pulse length. For each trigger pulse, a first output pulse is generated, signifying the presence of at least one input signal pulse. Additionally, for each trigger pulse a reference pulse is generated having a predetermined time period which is longer than the average duration of a trigger pulse developed in response to an input signal corresponding to only one true signal pulse. When the input signal pulse represents a merged pair of individual pulses, the duration of the corresponding trigger pulse extends beyond the termination of the reference pulse and the extended portion is employed to generate a second output pulse, thus resolving the merged pair of pulses into discrete pulses and restoring the true pulse count.

In a preferred embodiment, the apparatus includes means at the input signal pulse source to reshape the input signal pulses and give them each a predetermined time duration greater than the duration of the original signal pulse. The predetermined time duration, or width, is less, however, than ( and typically one-half of) the normal bandwidth resolution capability of the transmission system. It is also operative to provide an input signal of extended width in response to successive signal pulses occurring within the predetermined time duration, thus providing the trigger generator with a reliable indication of the close occurrence of a pair of signal pulses.

In further embodiments of the invention the period of the reference pulse is automatically variable in accordance with the average width of the trigger pulse to thereby compensate for variations or changes in the trigger pulse width. This improves the versatility of the apparatus by making it automatically compatible with other associated equipment using different signal source pulse rates or widths, and further ensures its reliability. Moreover, in one such embodiment, this period adjustment operation is rendered inoperative during time intervals where there is a high probability of receiving merged, doublet pulses. By so doing, the period adjustment operation will not be upset by merged, doublet pulses.

For a better understanding of the invention, as well as additional advantages thereof, reference may be made to the following detailed description of a representative embodiment, taken in conjunction with the drawings wherein:

FIG. 6 represents another embodiment of a pulse resolution system in accordance with the present invention; and FIGS. 7A–7G show signal waveforms for use in explaining the operation of the FIG. 6 embodiment.

Figure 1:
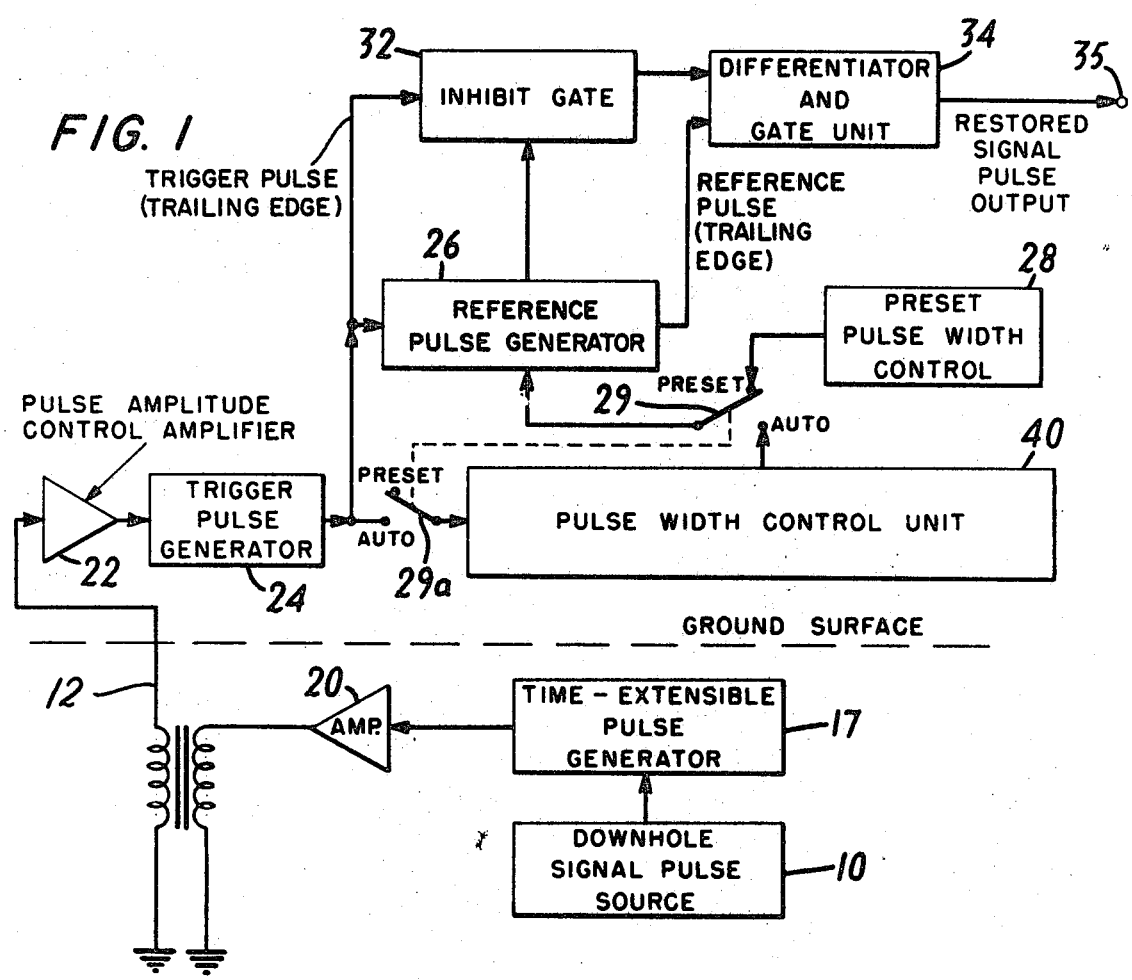
FIG. 1 is a block diagram of a pulse resolution system in accordance with the invention.
Figure 2:
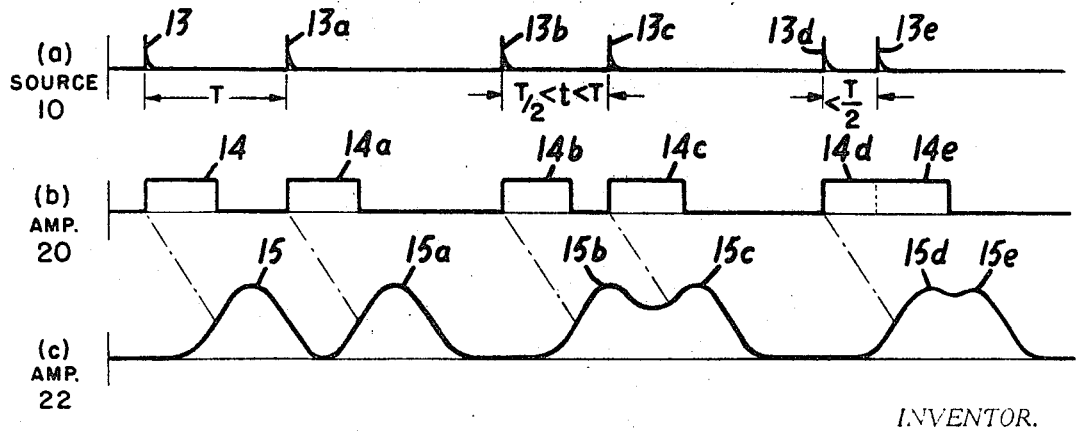
FIG. 2 is a graph of various signal waveforms helpful in describing the invention.

By way of example, the system will be described in connection with well logging apparatus in which a pulse source 10 located in a well tool (not shown) is suspended from a cable 12 in a well bore beneath the surface of the earth. The pulse source 10 may be, for example, a radiation detector, such as a scintillation counter, in which the signal pulse output varies in accordance with the intensity of detected radiation. Graph (*a*) of FIG. 2 shows a series of pulses such as might be generated by the downhole signal pulse source 10 in FIG. 1. As shown, the pulse train includes several sharp pulses 13 (*a–e*) in succession where the normal spacing between such pulses is expected to be appreciably greater than the width of the individual pulses 14 (*a–e*) produced by the generator 17. Heretofor, such pulses 14 (*a–e*) were transmitted directly via the cable to pulse counting means at the surface. However, since transmission along a cable produces a definitive deterioration of waveform, pulses 14*d* and 14*e*, as well as pulses 14*b* and 14*c*, which occur within the pulse resolution time period T, are considerably distorted at the surface so that accurate counting of the separate pulses is usually difficult to achieve and, hence, the pulse count will be in error.

While most pulses will have a spacing greater than T, the pulse resolution time, occasionally a second pulse, e.g., 14e, occurs in very close succession to one of the other pulses 14d. In FIG. 2(b), the pulses 14d and 14e are separated by less than one-half the pulse resolution time period (T/2). The pulses 14b and 14c illustrate the other possibility in which the pulses begin in a time period less than the pulse resolution time period T but greater than T/2. In either case, as observed in FIG. 2(c), by the time the pulses 14(a–e) reach the surface as pulses 15(a–3), the effects of the cable and the transfer characteristics of amplification and detection equipment at the surface render the pulses 15d and 15e, and also perhaps pulses 15b and 15c, indistinguishable from one another.

Returning to FIG. 1, in the present invention, the signal pulses from the source 10 are processed through a time-extensible pulse generator 17 which generates a pulse 14 of predetermined time duration substantially equal to one-half of the pulse resolution time period (T/2) upon receiving each sharp pulse 13 from the pulse source 10. When a second pulse (such as 14e), occurs before termination of the preceding pulse (14d) from the pulse generator 17, the predetermined pulse width is extended to include the normal predetermined pulse width (T/2) plus the time period be between the pulse 14d and the pulse 14e.

Figure 5:
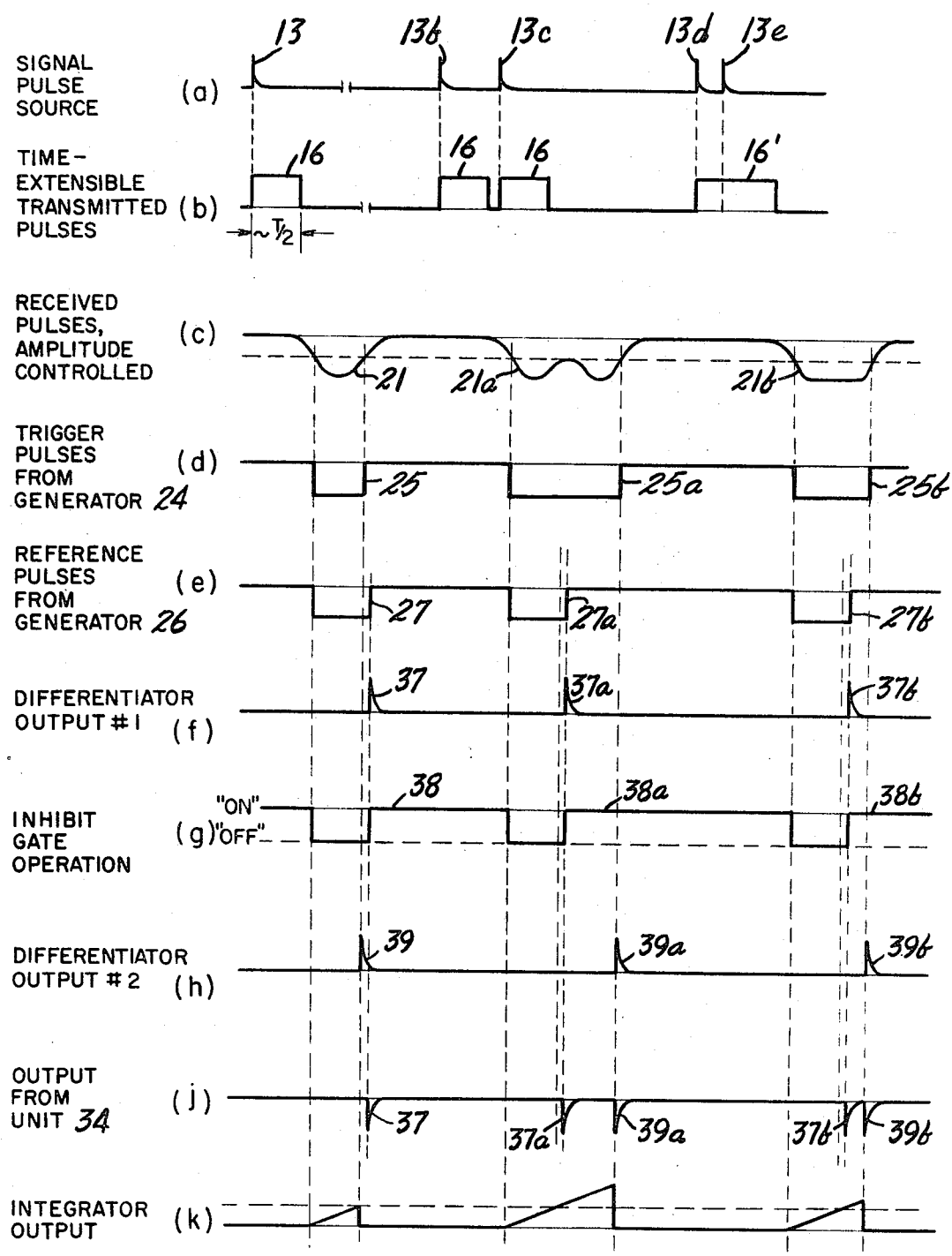
FIG. 5 is a series of graphs of several signal waveforms, showing the time relationship among the signals developed in various portions of the FIG. 1 system.

Referring to graphs (a) and (b) of FIG. 5, seen there, a pulse 16 at the output of the pulse generator 17 (graph b) has a predetermined duration for each pulse 13 occurring (with separations greater than T/2). When a second pulse such as pulse 13 appears in close succession to a preceding pulse 13, the generator 17 turns out a pulse 16' of extended duration. As shown, the width of the pulse 16' lasts for a period equal to the normal duration of a pulse 14 plus the time between the occurrence of the pulses 13d and 13e.

Pulses at the output of the time-extensible pulse generator 17 are amplified in the amplifier 20 and transmitted over the cable 12 to the uphole equipment. It will be clear that a suitable ground return is provided. At the surface, the pulses 16 are received by a pulse amplitude control amplifier 22 which has a controllable gain to automatically normalize the amplitude of the pulses at its output. That is, the amplifier 22 has a gain characteristic such that limited amplification is performed on strong signals, whereas small amplitude input signals are amplified to a greater degree. In this manner, the amplitude of the pulses 21 fed to the trigger unit 24 from the amplifier 22 are of substantially uniform height, as shown in graph (c) of FIG. 5 and the individual pulses 21 corresponding to the pulses 16 are of substantially equal with at their one-half amplitude levels. In FIG. 5(c), the pulses are shown negative to indicate the polarity reversal occurring in the amplifier 22. It will be observed that at the surface the pulses from the pulse generator 17 have lost most definition of shape, as shown by the pulses 21. The pulses 21 are also displaced in time relation to pulses to correspond to the travel time up the cable 12.

In the trigger generator 24, a negative-going amplitude controlled pulse 21 from the amplifier 22 is used to generate a trigger pulse 25 (FIG. 5(d)) having a duration corresponding to the half-amplitude width of the amplitude controlled pulses 21. The trigger output pulses 25 are then fed through an inhibit gate 32 and to a variable period one-shot reference pulse generator 26 which, upon initiation of a trigger pulse 25, generates a square pulse 27 (FIG. 5(e)) having a time period which is discretely greater than the average or normal width of a trigger pulse 25 developed in response to a pulse 21. The length of the pulses from the pulse generator 26 is controlled by a preset pulse width control unit 28 when selector switches 29, 29a are in the "PRESET" position. This is applicable when the normal pulse widths are stable and known and the incidence of closely spaced pulse pairs is large.

The reference pulse 27 from the generator 26 is routed to both the inhibit gate 32 and a combined differentiator and gate unit 34 which differentiates the trailing edge of the reference pulse to form a first output pulse 37 (FIG. 5(f)) for passage directly to the signal pulse output terminal 35 where the pulse 37 appears in inverted form (FIG. 5(j)). The trailing edges of trigger pulses 25 fed to the inhibit gate 32 are likewise differentiated, but are inhibited by the gate 32 under control of the reference pulses from the generator 26.

As outlined earlier, the end of the reference pulse 27 is used as a time reference point for the restoration of any second signal pulse occurring within the time period of extended pulses 16 or 16' from the downhole pulse generator 17. In the ordinary case, that is, where the pulses 13 from the pulse source 10 are sufficiently separated, the trigger pulse 25 will terminate before the reference pulse 27 is extinguished. In this instance, only one sharp output pulse 37, viz, the differentiated trailing edge of the reference pulse 27, will appear at the output of the unit 34 because of the inhibiting action of the gate 32. When, however, a pulse such as that indicated at 16' in FIG. 5(b) is received, the end of a trigger pulse 25b is extended beyond the termination of the reference pulse 27b and the inhibit gate 32 passes the trailing edge of the trigger pulse to the differentiator and gate unit 34.

The inhibit gate 32 is gated to the "off" condition only during the presence of a reference pulse 27, and therefore is in the "on" condition at the instant of occurrence of the trailing edge of any pulse 27, as indicated at 38, 38a and 38b in FIG. 5(g). The differentiated pulse 37b, therefore, appears at the output of the unit 34, as in the case of the pulses 37. Since, moreover, the gate 32 is also in the "on" condition when the trailing edge of trigger pulse 25b occurs, this trailing edge is also differentiated to develop the pulse 39b (FIG. 5(h)) which is passed by the gate 32 to the signal pulse output 35 (FIG. 5(j)), thus resolving the second of the closely spaced pulses 13d and 13e from a single input signal excursion.

It is also noticed from FIG. 5 that the present system is capable of resolving a pair of pulses from two separate pulses 16 (corresponding to signal pulses 13b and 13c) produced by generator 17, in which the pulse widths do not originally overlap. As shown in graph (c) of FIG. 5, two initially separate pulses 16 may be considerably distorted by the time they reach the detection equipment, such that they appear as a single input signal excursion 21a having a pair of ill-defined peaks. As long as the valley between these two peaks exceeds the half-amplitude level of the normalized pulse, a trigger pulse 25a will be generated which has a width sufficient to permit the gate 32 to return to its normally "on" condition, indicated at 38a, prior to the generation of the second sharp pulse 39a at the output 35, representing the one-time presence of the second pulse 13c of the downhole pulse pair 13b, 13c. If the signal amplitude between the peaks of the signal excursion 21a falls below the half-amplitude value of the normalized signal, then a separate trigger pulse corresponding to each peak is developed and operation in response to each trigger pulse is identical to that in response to a trigger pulse corresponding to a lone received pulse 21.

It may be desired to utilize apparatus in accordance with the invention as an integral part of any of a variety of systems in which different pulse rates and/or widths are transmitted from the downhole logging equipment. In such case, it is advantageous to automatically control the period of the pulses from the one-shot pulse generator 26 so that the period is increased or decreased in accordance with the average duration of the received pulses 21. This assures that the length of the pulses 27 from the pulse generator 26 is always discretely greater than the duration of the trigger pulses generated in response to an input signal containing only one signal pulse.

In the pulse width control to be described, it will be apparent that the pulse width control is operable for infrequent closely spaced pairs. For frequent closely spaced pairs, the same system can be used as long as narrow rather than long pulses are looked for. Referring to FIG. 1, in the automatic mode, the ganged switches 29 and 29a are moved to the "AUTO" position, whereupon a pulse width control unit 40 provides a control signal to the pulse generator 26 to effect the necessary adjustment in the reference pulse period. The operation of the unit 40 will be explained subsequently in greater detail in connection with the circuit of FIG. 3.

Figure 3:
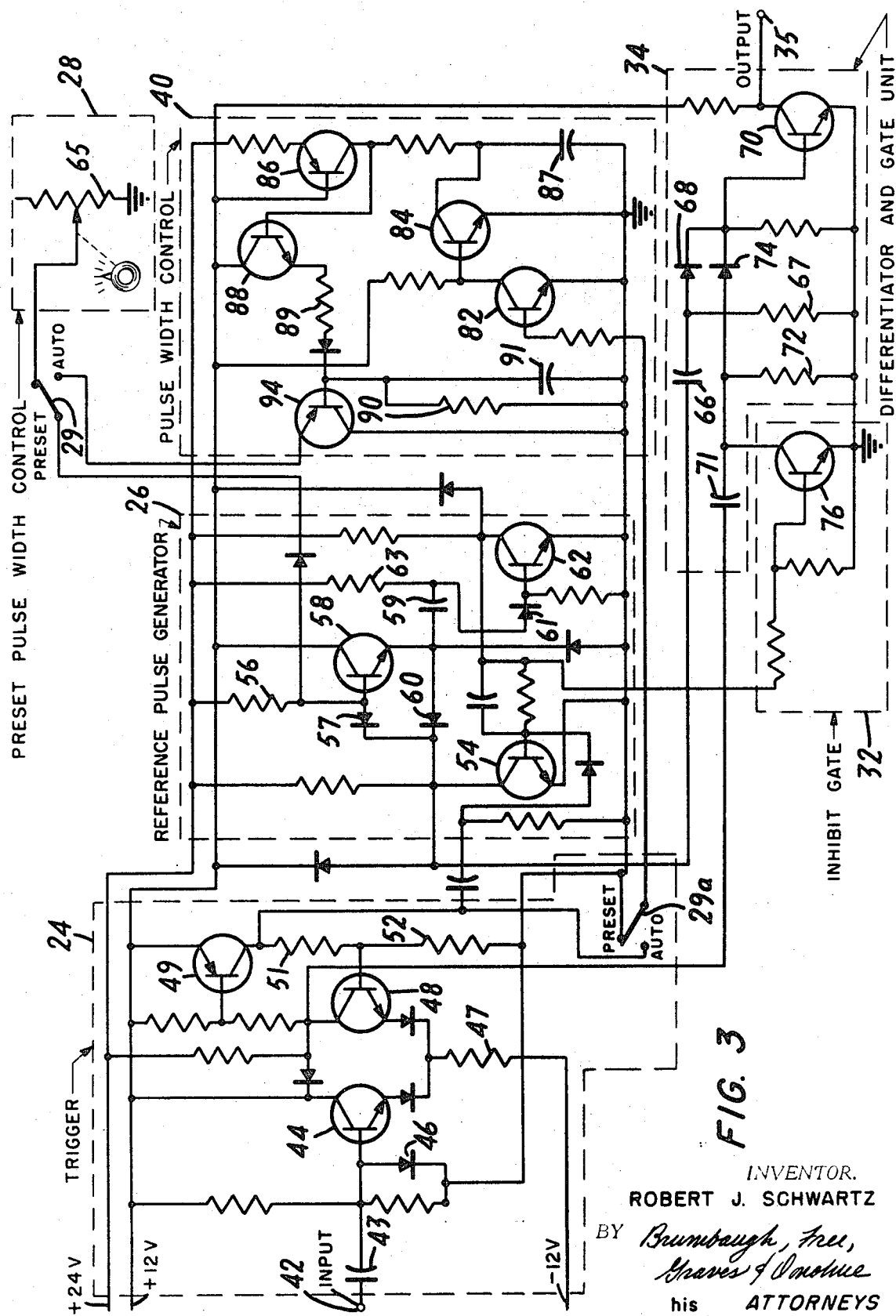
FIG. 3 is an electrical schematic of a portion of the system as shown in FIG. 1.

FIG. 3 illustrates in detail the above-surface portion of the apparatus shown in FIG. 1, excluding the pulse amplitude control amplifier 22. Beginning at the trigger unit 24, the extended pulses from the downhole pulse generator 17, amplified in the pulse amplitude control amplifier 22, are received at an input terminal 42 and pass through the coupling condenser 43 to the base of a normally conducting transistor 44. A diode 46 restores the DC level of the incoming signal at the base of the transistor 44 so that it can be triggered at the appropriate input signal level. Negative excursions of the signal (FIG. 5(c)) at the base of the transistor 44 are effective to drive the transistor into a low conducting stage. This reduces the potential at the top of the resistor 47 coupled to the emitter of the transistor 48, and the transistors 48 and 49 begin to conduct. Positive feedback applied to the base of the transistor 48 through the voltage divider network comprising the resistors 51 and 52 maintains the transistor 48 in the on-condition until the input signal level returns positive toward the level set by the ratio of the resistance values of resistors 51 and 52 when transistor 49 is conducting. The level set at the junction of resistors 51 and 52 is less than the forward drop of diode 46 when conducting.

The positive-going trigger pulse 25 (FIG. 5(d)) at the collector of the transistor 49 is coupled to the base of the transistor 54 in the one-shot multivibrator 26, turning this normally low conducting transistor to a high conductive state. When the transistor 54 conducts, current is drawn through the resistor 56 and diode 57, maintaining a cut-off potential at the base of a timing control transistor 58. Simultaneously, the potential drop occurring at the collector of the transistor 54 is coupled through a diode 60 and timing capacitor 59 to reverse-bias the diode 61 and turn off the other multivibrator transistor 62. The charge on the timing capacitor 59 then begins to dissipate in the resistor 63. At this point, a negative reference pulse (27 in FIG. 5(e)) appears at the collector of the transistor 54 and is applied to a first differentiator in the unit 34 comprising the capacitor 66 and a resistor 67. After differentiation, the pulse is set through the gate diode 68 to the gate transistor 70, yielding the narrow negative pulse shown in graph (j) of FIG. 5 at the output terminal 35.

At the same time a positive trigger pulse is developed at the collector of the transistor 49, a negative trigger pulse 25 is developed at the collector of the transistor 48. This negative reference pulse is supplied to a second differentiator, comprising elements 71 and 72, via the inhibit gate 32 whose operation will be described shortly.

Meanwhile, after a time dependent on the initial charge on the timing capacitor 59 and the circuit time constants, the one-shot multivibrator unit 26 returns to its quiescent state through conventional multivibrator action, thus terminating the reference pulse. To control the period of the generated reference pulse, the base of the transistor 58 is coupled through the switch 29, in the "PRESET" position, to a manually adjustable resistor 65 in the unit 28 which sets the transistor bias. When the multivibrator transistor 54 returns to its quiescent low-conducting state, the transistor 58 conducts to recharge the capacitor to an initial charge dependent upon the bias set in by the variable resistor 65. Thus, the width of the reference pulse 27 may be adjusted to a value slightly greater than the width of the trigger pulses 25 generated in response to an input signal representing only one signal pulse.

The reference pulse also appears, of course, at the collector of the transistor 62 with inverted (positive) polarity, and is fed to the base of the inhibit transistor 76. In the absence of a reference pulse from the collector of the transistor 62, the inhibit gate transistor 76 is in a fully conducting state, thereby shunting the resistor 72 and effectively bypassing to ground any signal from the differentiating capacitor 71.

Because of a second gate diode 74, only the positive excursion of the differentiated negative-going trigger pulse passes to the gate transistor 70. Consequently, only the differentiated pulse 39a or 39b (FIG. 5(h)), corresponding to the trailing edge of extended trigger pulse 25a or 25b, is ever utilized. This positive-going excursion reaches the base of the gate transistor 70 only when its occurrence is timed with the absence of a reference pulse 27.

For the most part, as mentioned above, the spacing between the signal pulses 13 from the source 10 is greater than the period of an extended pulse 18 (FIG. 5) from the downhole pulse generator 17. In this situation, the trigger pulse 25 ends prior to the termination of a reference pulse 27 from the variable period reference pulse generator 26. Consequently, the transistor 76 in the inhibit gate 32 is normally still in its fully conducting state prior to the arrival of the positive spike from the capacitor 71 corresponding to the trailing edge of the trigger pulse. When the pulses from the source 10 are closely spaced, however, as shown in FIG. 5 by the pulses 13d and 13e, a longer-than-normal input signal 16' is received by the trigger pulse generator 24, and the width of the trigger pulse 25b is increased proportionally to extend beyond the termination of the reference pulse 27b. Accordingly, the inhibit gate transistor 76 is cut off by the removal of the positive-going reference pulse applied to its base and is free to pass the spike 39a or 39b from the capacitor 71.

From the foregoing, it is apparent that the restored pulse pairs 37a, 39a, and 37b and 39b are separated in time by an amount which bears a specific time relation to the time separation between the pulses of the original downhole signal pulse pairs 13b, 13c and 13d, 13e, respectively. Since the half-amplitude widths of the pulses 21a and 21b, and therefore the widths of the trigger pulses 25a and 25b, are related to the spacing between the extended pulses 16 and 18' and, moreover, since the reference pulses 27 are always just discretely wider than the normal trigger pulses 25, the trailing edges of the extended trigger pulses 25a and 25b and the reference pulses 27 are separated by an amount proportional to the separation of the original signal pulses 13 less the difference in time width between a normal trigger pulse 25 and the reference pulses 27.

For example, both pulses 13b and 13c (FIG. 5) are extended in width by an equal amount so that the leading and trailing edges of the corresponding pulses 16 are separated in time by a value equal to the original time separation between pulses 13b and 13c. At the surface, the merged pulses comprising the pulse 21a at the output of the amplifier 22 are both delayed in time from their original relative positions, but are nevertheless displaced by an amount proportional to the original separation of pulses 13b and 13c. The width of the trigger pulse 25a, beginning and ending at times corresponding to the same amplitude level of the pulse 21a, is therefore proportional to this original spacing, as well. If, now, the reference pulses 27 are selected to have a width only slightly greater than the width of a normal trigger pulse 25, the trailing edges of the reference pulse 27a and the pulse 25a will also be separated by a time period approximately proportional to that original pulse spacing. Therefore, the separation of the output pulses 37a and 39a will bear approximately the same proportionality to the original separation, since only the trailing edges are used to generate the restored pulses at the output terminal 35.

With proper selection of the downhole and uphole pulse widths, the original spacing can be restored exactly, if desired. In such case, the normal half-amplitude width of the received pulses 21 and the width of the reference pulses 27 will be made approximately equal to the width of the pulses 16, with the reference pulses being slightly wider than the half-amplitude width of the pulses 21 restoring the original pulse-time distribution.

In passing, it may be remarked that, as an alternative approach, the trigger pulses 25 rather than the reference pulses 27 may be used to control the inhibit gate 32. In such case, the positive-going reference pulses (at the collector of the transistor 62) are supplied to the first differentiator (capacitor 66) and the negative-going reference pulses 27 to the second differentiator (capacitor 71). In this event, the first output pulse occurs at the leading edge of the reference pulse, and the second output pulse would occur at the trailing edge of the reference pulse. This arrangement is satisfactory for restoring the second pulse of a downhole pulse pair; however, the pulses of the restored pulse pair are then always separated by the width of the reference pulse and, hence, are not indicative of the spacing between the pulses of the original downhole signal.

For automatic control of the reference pulse width, the ganged switches 29 and 29a are moved from the "PRESET" position to the "AUTO" position, and the trigger signal from the collector of the transistor 49 is directed to the base of the transistor 82, switching this transistor on. The transistor 84, which is normally conducting to bypass current from the transistor 86 around an integrating capacitor 87, is thereby switched off, allowing the integrating capacitor 87 to charge to an amplitude depending on the duration of the trigger pulse, as shown in graph (k) of FIG. 5. (In graph (k), the normal level of the integrator at the end of each trigger pulse of average width is shown by the dashed line). The voltage developed across the capacitor 87 appears at the base of the emitter-follower transistor 88 which controls the current through the resistors 89 and 90 and the capacitor 91. This network 89, 90 and 91 provides an averaging function by which a portion of the voltage applied to the transistor 88 is averaged over a period of time and applied to the base of the transistor 94. With the switches 29, 29a in the "AUTO" position, the current through the transistor 94 automatically controls the voltage at the base of the timing control transistor 58, and, hence, the width of the reference pulse.

Figure 4:
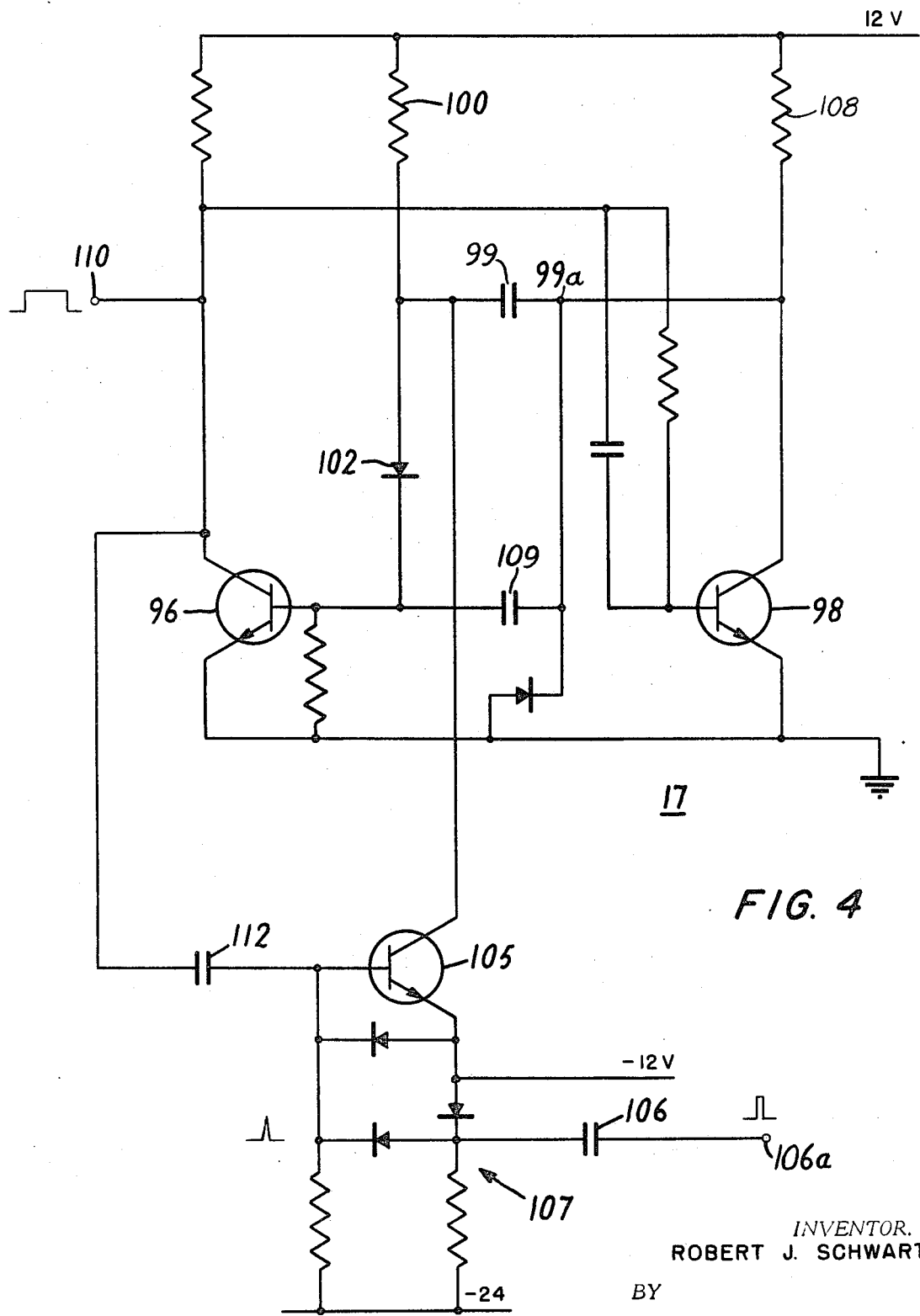
FIG. 4 is an electrical schematic of a particular unit of the system shown in FIG. 1.

Referring now to FIG. 4, there is shown a detailed schematic of the time-extensible pulse generator 17. This unit includes a conventional one-shot multivibrator comprised in part of the transistors 96 and 98 and the one-shot timing capacitor 99. The network including the resistor 100 and capacitor 99 comprise a timing network that determines the normal period of the one-shot multivibrator. Diode 102 is included to prevent destruction of the base-emitter junction of transistor 96 when being turned off. A third transistor 105 has its collector connected to one side of the timing capacitor 99 and its emitter to the negative voltage supply. Pulses from the pulse source 10 (FIG. 1) are coupled through an input terminal 106a and differentiating capacitor 106 to a diode network 107 which routes the positive-going differentiated peaks of the input signal to the base of the transistor 105. A positive-going peak places the transistor 105 in a highly conductive state which, in turn, effectively momentarily connects the capacitor 99 to the negative voltage supply. The capacitor 99 then rapidly charges to its maximum charge. At this time, increased conduction through (and a concomitant voltage drop across) the resistor 108 occurs. This voltage drop, appearing as a reduced potential at capacitor terminal 99a is immediately coupled through the capacitor 109 to the base of the transistor 96, rendering it non-conductive and, providing a positive pulse at the output terminal 110. At the same time, the output pulse is applied through the capacitor 112 to the base of the transistor 105, maintaining the transistor 105 on for a short period of time to ensure that the capacitor 99 attains its full charge. The output pulse is also conventionally coupled to the base of the transistor 98 which then conducts, and the capacitor 99 begins to discharge through the resistor 100. From this point on, the switching operation of the transistors 96 and 98 follows the operation of a conventional one-shot multivibrator. The transistor 96 thereafter remains non-conductive because of the reduced potential at the junction of resistors 100 and 101 which is seen at the base of the transistor. Until the capacitor 99 discharges to a degree sufficient to raise the base potential of the transistor 96 into the conducting region, it will remain off.

The pulse resulting from the application of a single pulse to the input terminal 106a is a pulse of predetermined duration. However, assuming the occurrence of a second pulse prior to the time when the transistor 96 returns to its conductive state, the transistor 105 is again switched on and the capacitor 99 is immediately recharged to its fully charged state. This results in a re-initiation of the one-shot switching sequence and the transistor 96 remains in its "off-condition" for an additional period equal to the predetermined pulse width. Thus, the width of the pulse at the output terminal 110 is extended to a total length equal to the predetermined pulse width plus a width corresponding to the time spacing between the applied pulse pair at the terminal 106a. The circuit of FIG. 4, therefore, ensures that a pulse 16' (FIG. 5(a)) corresponding to a closely spaced signal pulse pair 13d, 13e is longer than the width of a normal pulse 16 developed in response to a single signal pulse 13, 13b and 13c.

Turning now to FIG. 6, there is shown another embodiment of the present invention. In this FIG. 6 embodiment, the pulse width of the reference pulse is maintained a fixed amount greater than the pulse width of the single, unmerged signal pulses by a pulse width control circuit of a different nature than that described in FIG. 3. The FIG. 6 pulse width control circuit, designated 119, of a pulse resolver circuit 120 operates to generate an overlap pulse having a pulse width equal to the amount that each reference pulse overlaps or exceeds each corresponding signal pulse. The control circuit 119 then proceeds to adjust the width of the reference pulses to make the overlap pulse width relatively constant.

Now concerning how this operation takes place and referring to FIGS. 6 and 7A–7G in conjunction, the well logging pulses are processed by an automatic gain control amplifier 22 and a trigger pulse generator circuit 24 to produce the gain adjusted signal pulses of FIG. 7A and the trigger pulses of FIG. 7B in the same manner as discussed in FIG. 1. The trigger pulses of FIG. 7B are then applied to a pulse resolver circuit 120.

Within the pulse resolver circuit 120, the leading or falling edges of the negative trigger pulses energize an adjustable period one-shot 121 which can take the form of the reference pulse generator 26 of FIG. 3. The reference pulse output from the adjustable period one-shot 121, shown in FIG. 7C, is supplied to a pulse regenerator circuit 122 along with the trigger pulses from generator 24. This pulse regenerator 122, which could comprise the inhibit gate 32, differentiator and gate unit 34 of FIG. 3, operates to regenerate the resolved pulses in the same manner as discussed earlier with the FIG. 3 apparatus. This portion of the circuitry just described thus can be essentially the same as the FIGS. 1 and 3 circuits for performing the same operation.

Now concerning the pulse width control circuit 119, the leading or rising edge of the reference pulse from one-shot 121 energizes a fixed time one-shot 123 by way of a normally de-energized inhibit gate 124. The output pulses from the fixed time one-shot 123, shown in FIG. 7E, are always of the same pulse width. These pulses of FIG. 7E energize a constant current switch 125 for charging a capacitor 126 at a fixed rate to place a fixed amount of charge on capacitor 126 per incident pulse. (Since the charging current is constant, the rate of change or charge or voltage in capacitor 126 is constant. Thus, the time during which charge is transferred to capacitor 126 will determine the total amount of charge transferred.)

To discharge the capacitor 126, and AND gate 127 is responsive to each reference pulse from the adjustable period one-shot 121 and each related trigger pulse from the trigger pulse generator 24 by way of an inhibit gate 128 for generating an overlap pulse (see FIG. 7D) having a time deviation equal to the overlap between the reference and signal pulses. Thus, comparing the trigger and reference pulses of FIGS. 7B and 7C, it can be seen that the overlap pulses of FIG. 7D will have pulses widths corresponding to this overlap. The overlap pulse from AND gate 127 energizes a constant current switch 129 which operates to discharge the capacitor 126 an amount proportional to each overlap duration.

The voltage across the capacitor 126 is applied to a buffer amplifier for application to the adjustable period one-shot 121 for adjusting the period thereof. This buffer amplifier 130 could take the form of, for example, a source follower utilizing a field effect transistor. By this configuration, the charge on capacitor 126 will not discharge through the circuitry connected to it. The buffer amplifier 130 drives the base of the transistor 94 for adjusting the period of the adjustable period one-shot 121 in the same manner as in FIG. 3.

Now concerning the operation of the pulse width control portion of the pulse resolver circuit 120, the circuit 119 will always operate to maintain the pulse width of the overlap pulse of FIG. 7D substantially constant. This is accomplished by adding a fixed amount of charge on the capacitor 126 for each uninhibited trigger pulse and then subtracting an amount of charge proportaional to the pulse width of the overlap pulse. By appropriately selecting the relative rates of charge and discharge, the overlap pulse width can be maintained at a predetermined value.

Thus, in FIG. 6, the energization of the switch 125 by the fixed time one-shot 123 will operate to always add a fixed amount of charge to the capacitor 126 for each trigger pulse of FIG. 7B. Each overlap pulse, on the other hand, will energize the constant current switch 129 to remove an amount of charge from capacitor 126 proportaional to the pulse width of the overlap pulse. By adjusting the ratio of the charging and discharging currents from constant current switches 125 and 129, the pulse width of the overlap pulse can be maintained at some desired pulse width relative to the pulse width of the fixed time pulses of FIG. 7E. When each overlap pulse has this desired pulse width, there will be just as much charge removed from the capacitor 126 as there is added to it, thus giving rise to an equilibrium condition.

Thus, looking at FIG. 7F which shows the charge change or current into and out of capacitor 126, it can be seen that a fixed amount of charge will always be placed on capacitor 126 and an amount of charge proportional to the overlap pulse width will always be removed therefrom. (The shaded areas under the + and − current pulses represents the total amount of charge added to or removed from capacitor 126 each time.) The voltage or charge on capacitor 126 will then build up or decay at constant rates for each incident pulse, as shown in FIG. 7G, with the time interval during which the capacitor 126 has to increase or decrease determining the voltage level. Thus, it can be seen that if the overlap pulse of FIG. 7D has the proper pulse width, there will be just as much charge taken from capacitor 126 as there is added thereto.

It would not be desirable for the pulse width control circuit 119 to react instantaneously to adjust the reference pulse width because of the occurrence of occasional merged, doublet pulses or noise. However, by appropriately selecting the amount of charge that can be exchanged by capacitor 126 at any given time, (i.e., selecting the value of capacitor 126), an occasional merged, doublet pulse will not have a great effect on the operation of the control circuit 119. In this connection, it should be noted here that FIG. 7F is shown on a highly expanded amplitude scale for purposes of explanation. In fact, the value of capacitor 126 is sufficiently great that a single incident pulse will produce a barely noticeable change.

As an example of this, assume that the merged doublet pulse 135 of FIG. 7A is received to thus produce the trigger pulse 136 of FIG. 7B. The corresponding reference pulse 137 of FIG. 7C will have the same pulse width as the prior reference pulse. Comparing FIGS. 7B and 7C, it can be seen that there will be no overlap pulse in this instance and thus, from FIG. 7F, there will be an addition of charge to the capacitor 126 but no subtraction therefrom, thus producing the corresponding rise in voltage shown in FIG. 7G. However, due to the slow system response time, the control voltage to one-shot 121 will change very little.

Now assume that the next signal pulse is a single unmerged pulse, as represented by the pulse 138 of FIG. 7A. This pulse 138 will produce the trigger pulse 139 of FIG. 7B. Since the control voltage applied to the adjustable period one-shot 121 has risen slightly, the reference pulse 140 corresponding to the pulses 138 and 139 will be slightly greater in pulse width than the prior reference pulse 137, thus causing the corresponding overlap pulse 141 of FIG. 7D to be greater. Thus, as shown in FIG. 7F, there will be more charge removed from the capacitor 126 than is added to it, thus causing the voltage on capacitor 126 to decrease slightly causing a decrease in the control voltage applied to one-shot 121. After a number of such single, unmerged pulses, the control voltage of FIG. 7G will return to its equilibrium level.

Now assume that the signal pulses of FIG. 7A increase in pulse width for one reason or another. Such an occurrence is shown by the pulse 143 (and subsequent pulses) of FIG. 7A. In this event, the corresponding trigger pulses will also increase in pulse width. In this example, they increase initially to the same pulse width as the reference pulse 145 of FIG. 7C. Thus, there will be no overlap pulse and thus charge will be added to the capacitor 126 but not subtracted therefrom, as shown in FIG. 7F. This, then, will cause the control voltage to increase. Because of the slow system response time, it will take a number of these longer pulse width signal pulses to bring about an equilibrium condition. However, each time one of these longer pulse width signal pulses is received, the pulse width of the reference pulses of FIG. 7C will increase slightly to thus cause the pulse width of the overlap pulses of FIG. 7D to also increase slightly, as is exemplified by the pulse 146 in FIG. 7D. Eventually, the system will come into equilibrium where the same amount of charge is removed from capacitor 126 as is added thereto. Thus, the overlap pulses (FIG. 7D) will eventually return to their desired pulse width as represented by the overlap pulse 147.

By this arrangement, it can be seen that the pulse width control circuit 119 will always operate to make the reference pulse width a fixed amount greater than the trigger pulse width for single, unmerged pulses so as to accurately resolve the signal pulses of FIG. 7A.

In some well logging systems, there are times when the instantaneous transmission pulse rate is substantially greater than the average transmission pulse rate. Of course, during such periods of high pulse rate, there is a stronger probability of the surface equipment receiving merged, doublet pulses from the cable conductors than during other times. As discussed earlier in connection with the doublet pulse 135 of FIG. 7A, such doublet pulses tend to cause an erroneous adjustment of the pulse width of the reference pulses of FIG. 7C.

To circumvent this problem, the FIG. 6 apparatus includes a noise control flip-flop 150 which operates to energize the inhibit gates 124 and 128 during such periods where merged pulses are likely to frequently occur so as to disengage the pulse width control circuit 119 from the remainder of the pulse resolver circuit 120. Thus, the noise control flip-flop 150 can be set at the beginning of such high pulse repetition rate periods and reset at the end of such periods to provide a more accurate operation of the pulse resolver circuit 120.

An example of such a well logging system having such high instantaneous pulse repetition rate is the radioactivity logging system found in copending application Ser. No. 592,795 filed by William B. Nelligan on Nov. 8, 1966. In this Nelligan system, a pulse neutron source is repetitively energized to irradiate the adjoining formations with neutrons and a nearby scintillation counter detects the gamma rays emitted due to the capture of these neutrons by the elements in the formation. The pulse repetition rate of the scintillation counter will be very high immediately after irradiation and will decrease as a function of time after irradiation. Thus, the noise control flip-flop 150 could be set, for example, when the formations are irradiated with neutrons and reset at some later time when the probability of receiving merged doublet pulses is substantially low.

Briefly describing the operation of this Nelligan system, a well tool 151 is supported in a borehole 152 for investigating adjacent earth formations 153 on the end of a cable 154. At the surface of the earth, suitable panel circuits 155 operate to energize a pulsed neutron source 156 to irradiate the formations 153 with neutrons and a radiation detector 157 causes pulses to be transmitted to the surface of the earth for application to the automatic gain control amplifier 22, trigger pulse generator 24 and pulse resolver circuit 120.

The resolved pulses from the pulse regenerator 122 are then applied to a computing circuit 158 which generates a output signal to a voltage controlled oscillator 159 representative of the rate of decay of thermal neutrons in the media surrounding the tool 151. This voltage controlled oscillator 159 then generates pulses having a period representative of the formation thermal decay time constant for application to suitable counting circuits 160. These counting circuits 160 control the overall timing of the system including energizing the pulse neutron source 156 and supplying pulses to the set and reset inputs of the noise control flip-flop 150 during those periods when the probability of receiving merged pulses is known to be high. The output signal from the voltage controlled oscillator 159 is then supplied to a suitable period measuring circuit 160 which generates an output signal proportional to the formation decay time constant for application to a suitable recorder 161.

It is to be understood that other systems than the above described Nelligan system could be utilized with the pulse resolving circuit of the present invention, the Nelligan system only being described to give a specific example of well logging apparatus that could be used with the pulse resolver circuit of the present invention.

From the foregoing, it will be appreciated that the invention provides an apparatus which reliably detects and reproduces the individual pulses of a pulse train by resolving into individual pulses those pulse pairs which have become merged into single pulses during transmission and would otherwise avoid detection. In addition, the restored pulses bear a specific time relation to each other that is related to the actual spacing of between the original pulses generated downhole. Moreover, with the employment of the automatic pulse width control feature, the apparatus is easily adapted, without manual adjustment and calibration, to existing systems using different pulse rates or pulse widths in the signal pulse source equipment even when the pulse repetition rate is extremely high at times. It should also be point out that while the pulse resolution system of the present invention was directed toward the resolution of two merged pulses, an obvious extension of the present invention could be implemented to resolve 3, 4 or more merged pulses. Thus, by utilizing a plurality of reference pulse generators (like generator 26) having selected duty cycles and associated circuits, any desired number of merged pulses could be resolved.

Although the invention has been described with reference to specific embodiments thereof, may modifications and variations, both in form and detail, may be made within the skill of the art. All such modifications and variations, therefore, are intended to be included within the scope and spirit of the invention as defined in the appended claims.

I claim:

1. In an earth bore logging system including a pulse source which produces a pulse train for transmission over a distorting medium from a location within the bore, the pulses of said train before transmission being variably spaced so that at least two successive pulses of said train may be so closely spaced that they merge into a single, longer duration pulse during transmission through said medium, apparatus for restoring the two pulses of the pulse train received after transmission to the surface, comprising:
 means responsive to said received pulse train for generating for each individual received pulse thereof a trigger pulse having a duration proportional to the duration of the respective received pulse, and a reference pulse terminating subsequent to the termination of a trigger pulse generated in response to a received pulse representative of a single pulse before transmission; and
 signal pulse output means responsive to each related pair of trigger and reference pulses including
 a. means for producing at an output terminal a first output pulse upon each occurrence of one of the related trigger and reference pulses and
 b. means for producing a second output pulse at the output terminal upon overlap of the trigger pulse and the trailing edge of the reference pulse.

2. A system as set forth in claim 1 in which the duration of the reference pulse is greater than the duration of a trigger pulse generated in response to a received pulse representative of a single pulse before transmission.

3. In an earth bore logging system including a pulse source which produces a pulse train for transmission over a distorting medium from a location within the bore, the pulses of said train before transmission being variably spaced so that at least two successive pulses of said train may be so closely spaced that they merge into a single, longer duration pulse during transmission through said medium, apparatus for restoring the two pulses of the pulse train received after transmission to the surface, comprising:
 means responsive to said received pulse train for generating for each individual received pulse thereof a trigger pulse having a duration proportional to the duration of the respective received pulse, and a reference pulse terminating subsequent to the termination of a trigger pulse generated in response to a received pulse representative of a single pulse before transmission;
 signal pulse output means responsive to each related pair of trigger and reference pulses for producing at an output terminal a first output pulse upon each occurrence of one of the related trigger and reference pulses and a second output pulse upon overlap of the trigger pulse and the trailing edge of the reference pulse; and
 means responsive to the trigger pulses for changing the duration of the reference pulse in accordance with variations in the trigger pulse duration.

4. A system in accordance with claim 3 wherein
 the means for changing the duration of the reference pulse comprises a circuit for producing a control signal whose amplitude is a function of variations in the duration of the trigger pulse, and
 the reference pulse generating means includes means responsive to the amplitude of the control signal for determining the duration of the reference pulse.

5. A system in accordance with claim 4, further comprising:
 means for averaging the amplitudes of the control signals corresponding to successive trigger pulses.

6. A system in accordance with claim 4, in which the control signal producing means comprises:
 a current source,
 a charging circuit in series with the current source, and
 an input circuit receiving the trigger pulse for limiting the charge attainable by the charging circuit in the absence of the trigger pulse.

7. In an earth bore logging system including a pulse source which produces a pulse train for transmission over a distorting medium from a location within the bore, the pulses of said train before transmission being variably spaced so that at least two successive pulses of said train may be so closely spaced that they merge into a single, longer duration pulse during transmission through said medium, apparatus for restoring the two pulses of the pulse train received after transmission to the surface, comprising:
 means responsive to said received pulse train for generating for each individual received pulse thereof a trigger pulse having a duration proportional to the duration of the respective received pulse:
 means responsive to each of said trigger pulses for producing a reference pulse terminating subsequent to the termination of a trigger pulse generated in response to a received pulse representative of a single pulse before transmission;

a first differentiator for differentiating one of the reference and trigger pulses to produce the first output pulse;

a second differentiator for differentiating a pulse corresponding to the trailing edge of one of the reference and trigger pulses; and differentiator control means responsive to the other of the last-named reference and trigger pulses to inhibit the passage of the corresponding pulse to the output terminal during the time occupied by the reference pulse.

8. A system as defined in claim 7, in which:

the first differentiator operates on the edge of the reference pulse, the second differentiator operates on a pulse corresponding to the trailing edge of the trigger pulse, and the differentiator control means is responsive to the reference pulse.

9. A system as recited in claim 8, in which:

the first differentiator differentiates the trailing edge of the reference pulse.

10. In an earth bore logging system including a pulse source which produces a pulse train for transmission over a distorting medium from a location within the bore, the pulses of said train before transmission being variably spaced so that at least two successive pulses of said train may be so closely spaced that they merge into a single, longer duration pulse during transmission through said medium, apparatus for restoring the two pulses of the pulse train received after transmission to the surface, comprising:

means responsive to said received pulse train for generating for each individual received pulse thereof a trigger pulse having a duration proportional to the duration of the respective received pulse, and a reference pulse terminating subsequent to the termination of a trigger pulse generated in response to a received pulse representative of a single pulse before transmission;

signal pulse output means responsive to each pair of related trigger and reference pulses for producing at an output terminal a first output pulse upon each occurrence of one of the related trigger and reference pulses and a second output pulse when the duration of the trigger pulse exceeds the duration of the reference pulse; and means for controlling the occurrence of the first and second output pulses so that the time separation therebetween is related to the time separation between the two successive pulses of the pulse train.

11. In an earth bore logging system including a pulse source which produces a pulse train for transmission over a distorting medium from a location within the bore, the pulses of said train before transmission being variably spaced so that at least two successive pulses of said train may be so closely spaced that they merge into a single, longer duration pulse during transmission through said medium, apparatus for restoring the two pulses of the pulse train received after transmission to the surface, comprising:

means responsive to said received pulse train for generating for each individual received pulse thereof a trigger pulse having a duration proportional to the duration of the respective received pulse;

means responsive to each of said trigger pulses for producing a reference pulse terminating subsequent to the termination of a trigger pulse generated in response to a received pulse representative of a single pulse before transmission;

signal pulse output means responsive to each related pair of trigger and reference pulses for producing at an output terminal a first output pulse upon each occurrence of one of the related trigger and reference pulses and a second output pulse upon overlap of the trigger pulse and the trailing edge of the reference pulse; and amplifying means connected between the distorting medium and the trigger pulse generating means and having a transfer characteristic effective to produce successive individual received pulses of substantially constant amplitude at the output thereof.

12. In an earth bore logging system including a pulse source which produces a pulse train for transmission over a distorting medium from a location within the bore, the pulses of said train before transmission being variably spaced so that at least two successive pulses of said train may be so closely spaced that they merge into a single, longer duration pulse during transmission through said medium, apparatus for restoring the two pulses of the pulse train received after transmission to the surface, comprising:

means responsive to said received pulse train for generating for each individual received pulse thereof a trigger pulse having a duration proportional to the duration of the respective received pulse;

means responsive to each of said trigger pulses for producing a reference pulse terminating subsequent to the termination of a trigger pulse generated in response to a received pulse representative of a single pulse before transmission;

signal pulse output means responsive to each related pair of trigger and reference pulses for producing at an output terminal a first output pulse upon each occurrence of one of the related trigger and reference pulses and a second output pulse upon overlap of the trigger pulse and the trailing edge of the reference pulse; and means connected between the distorting medium and the trigger pulse generating means and having a transfer characteristic effective to produce successive individual received pulses representative of a single pulse before transmission, each individual received pulse having the same pulse width at a predetermined amplitude thereof.

13. In an earth bore logging system including a pulse source which produces a pulse train for transmission over a distorting medium from a location within the bore, the pulses of said train before transmission being variably spaced so that at least two successive pulses of said train may be so closely spaced that they merge into a single, longer duration pulse during transmission through said medium, apparatus for restoring the two pulses of the pulse train received after transmission to the surface, comprising:

means responsive to said received pulse train for generating for each individual received pulse thereof a trigger pulse having a duration proportional to the duration of the respective received pulse;

means responsive to each of said trigger pulses for producing a reference pulse terminating subsequent to the termination of a trigger pulse generated in response to a received pulse representative of a single pulse before transmission;

signal pulse output means responsive to each related pair of trigger and reference pulses for producing at an output terminal a first output pulse upon each occurrence of one of the related trigger and reference pulses and a second output pulse upon overlap of the trigger pulse and the trailing edge of the reference pulse; and pulse-extending means responsive to the pulses of the pulse train before transmission to produce corresponding pulses for transmission, each of the corresponding pulses having a predetermined time duration greater than the duration of individual pulse train pulses and less than the normal expected time period between successive pulse train pulses.

14. A system as defined in claim 13, in which:

the trigger pulses are approximately equal in width to the width of the corresponding pulses produced by the pulse-extending means.

15. A system as defined in claim 13, in which:

the corresponding pulses each have a duration equal to the predetermined time duration plus the time period between successive individual pulse train pulses occurring within the predetermined time duration.

16. A system according to claim 13, in which the pulse-extending means comprises:

monostable multivibrator means for generating an output pulse in response to an input pulse and including a chargeable element upon which the charge is determinative of the output pulse width;

a source of charging current; and switch means coupled between the charging current source and the chargeable element and operable to connect the chargeable element in circuit with the current source for a time sufficient to charge the element to a predetermined value upon each occurrence of an input pulse.

17. In an earth bore logging system including a pulse source which produces a pulse train containing variably spaced pulses for transmission over a distorting medium from a location within the bore, at least two successive pulses of the pulse train being so closely spaced that they merge into a single pulse of longer duration during transmission through the medium, apparatus for detecting the occurrence of the two closely spaced pulses from the pulse train received after transmission through the medium to the earth's surface, comprising:

means responsive to the received pulse train for generating for each individual received pulse thereof a trigger pulse having a duration proportional to the duration of the respective received pulse;

means responsive to the initiation of the trigger pulse for generating a reference pulse having a duration greater than a predetermined average duration of trigger pulses generated in response to successive received pulses representative of single pulses of the pulse train before transmission;

output means responsive to the trigger and reference pulses for providing to an output terminal a first output pulse for each occurrence of the trigger pulse and a second output pulse upon the termination of one of the trigger and reference pulses;

and gating means responsive to the other of the trigger and reference pulses for inhibiting the passage of the second output pulse to the output terminal except upon time overlap of the trigger pulse and the termination of the reference pulse.

18. Apparatus for generating an output pulse having a normal predetermined duration that is controllably extendible in accordance with the time period between successive input pulses comprising:

monostable multivibrator means for generating an output pulse in response to an input pulse and including a normally conducting active element and a normally nonconducting active element, each such element having a control electrode, and a chargeable element upon which the charge is determinative of the output pulse width;

means for providing a current limited discharge path for the chargeable element to deplete a given applied charge thereon in a given time period;

a source of charging current, switch means operable to connect the chargeable element in circuit with the current source for a time sufficient to charge the element to a predetermined value and unidirectionally change the potential at one terminal thereof upon each occurrence of an input pulse; and means for coupling said potential change to the control electrode of one of the active elements to change the state of conduction thereof for a duration determined by the time period of discharge.

19. Apparatus in accordance with claim 18 in which:

the active elements comprise a pair of interconnected transistor means having control and output electrodes, each transistor having a normal state of conduction opposite to the conduction state of the other transistor; and the switch means is connected to the one terminal of the chargeable element.

20. Apparatus as defined in claim 19, in which:

the switch means is a third transistor having base, emitter and collector electrodes, the emitter and collector electrodes being serially connected to the current source and the capacitor, and the base being connected to receive the input pulse so as to render the third transistor momentarily conductive upon the occurrence of the input pulse.

21. Apparatus as defined in claim 20, further comprising:

regenerative feedback means coupled to one of the emitter and base electrodes of the third transistor and responsive to the output pulse to maintain the third transistor conductive for a time sufficient to charge the capacitor to a maximum predetermined charge.

22. In an earth bore logging system including a pulse source which produces a pulse train for transmission over a distorting medium from a location within the bore, the pulses of said train before transmission being variably spaced so that at least two successive pulses of said train may be so closely spaced that they merge into a single, longer duration pulse during transmission through said medium, apparatus for restoring the two pulses of the pulse train received after transmission to the surface, comprising:

means responsive to said received pulses for generating for each received pulse a trigger pulse having a duration representative of the duration which the respective received pulses exceed a given threshold level and a reference pulse having an adjustable duration which is greater than the trigger pulse duration for a single pulse;

means responsive to the trigger and reference pulses for generating one pulse if the trigger pulse duration is less than the reference pulse duration and at least two pulses if the trigger pulse duration is greater than the reference pulse duration;

means responsive to the trigger pulse for generating a control signal having a characteristic that is a function of the difference between the durations of said related trigger and reference pulses; and means responsive to said control signal for adjusting said reference pulse duration to reduce variations in said control signal characteristic.

23. A system according to claim 22, in which:

the control signal generating means includes means for comparing the durations of the trigger and reference pulses.

24. A system according to claim 23, in which:

the comparing means produces an overlap pulse of which the duration represents the difference in the durations of related trigger and reference pulses.

25. A system according to claim 24, in which the control signal responsive means comprises:

means responsive to the overlap pulse for generating a pulse adjustment signal having an incremental amplitude variation for each occurrence of one of the related trigger and reference pulses;

means responsive to the overlap pulse for modifying the amplitude variation of the adjustment signal according to the duration of the overlap pulse; and means for applying said adjustment signal having the modified amplitude variation to the means generating the reference pulse to vary the duration of the reference pulse.

26. A system as defined in claim 24, in which the control signal responsive means comprises:

a circuit operative to be charged upon the application of current thereto;

a current source;

means responsive to the occurrence of one of the related trigger and reference pulses for generating a pulse of fixed duration;

means responsive to one of the reference and fixed duration pulses for connecting the current source to the charging circuit to place a charge thereon;

means responsive to the other of the reference and fixed duration pulses for discharging the charging circuit; and means for applying a signal representative of the charge on the charging circuit to the reference pulse generating means to vary the duration of the reference pulse.

27. A system as defined in claim 26, in which:

current source connecting means is operative to apply the current source to charge the charging circuit at a fixed rate; and the discharging means includes a circuit providing a current discharge path for the charging circuit.

28. A system as set forth in claim 27, in which:

the charging circuit and current discharge path have respective time constants associated therewith that are unequal.

29. A system as defined in claim 22, further comprising:

means responsive to the rate of occurrence of the pulses in the signal pulse train for disabling the control signal responsive means during periods when said rate of occurrence varies from a preselected desired range.

30. In an earth bore logging system of the type including pulse resolver apparatus for restoring two transmitted signal pulses that may be so closely spaced that they merge into a single pulse of longer duration during transmission to the pulse resolver apparatus:

means responsive to the signal pulses for generating a trigger pulse having a duration representative of the duration of each signal pulse received at the pulse resolver apparatus and a reference pulse of variable duration greater than the duration of a trigger pulse representing a received unmerged signal pulse;

means jointly responsive to the trigger and reference pulses for producing a first pulse if the reference pulse duration exceeds the trigger pulse duration and at least two pulses if the reference pulse duration is less than the trigger pulse duration;

means responsive to the trigger pulse duration for controlling the duration of the reference pulse; and means responsive to the rate of occurrence of the signal pulses for selectively disabling the last-named means when said rate varies from a preselected range.

* * * * *